United States Patent
Zhou et al.

(10) Patent No.: US 10,745,776 B2
(45) Date of Patent: Aug. 18, 2020

(54) METHOD AND DEVICE FOR INCREASING LASER-INDUCED SHOCK WAVE PRESSURE

(71) Applicant: Jiangsu University, Jiangsu (CN)

(72) Inventors: Jianzhong Zhou, Jiangsu (CN); Xiankai Meng, Jiangsu (CN); Shu Huang, Jiangsu (CN); Jie Sheng, Jiangsu (CN); Chun Su, Jiangsu (CN); Hongda Zhou, Jiangsu (CN); Xiangwei Yang, Jiangsu (CN); Hansong Chen, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 319 days.

(21) Appl. No.: 15/752,444

(22) PCT Filed: Sep. 7, 2015

(86) PCT No.: PCT/CN2015/089032
§ 371 (c)(1),
(2) Date: Feb. 13, 2018

(87) PCT Pub. No.: WO2017/024649
PCT Pub. Date: Feb. 16, 2017

(65) Prior Publication Data
US 2019/0010576 A1    Jan. 10, 2019

(30) Foreign Application Priority Data
Aug. 13, 2015 (CN) .......................... 2015 1 0494320

(51) Int. Cl.
*C21D 10/00* (2006.01)
*B23K 26/348* (2014.01)
*B23K 26/356* (2014.01)

(52) U.S. Cl.
CPC .......... *C21D 10/005* (2013.01); *B23K 26/348* (2015.10); *B23K 26/356* (2015.10); *C21D 10/00* (2013.01)

(58) Field of Classification Search
CPC .. B23K 26/348; B23K 26/356; B23K 26/352; B23K 26/3568; B23K 26/3576;
(Continued)

(56) References Cited

U.S. PATENT DOCUMENTS

| 5,313,056 A   | 5/1994  | Kim et al.    |              |
| 6,719,449 B1* | 4/2004  | Laugharn, Jr. | B01F 11/02   |
|               |         |               | 366/127      |
| 7,288,293 B2* | 10/2007 | Koulik        | H01J 37/32321|
|               |         |               | 427/535      |

FOREIGN PATENT DOCUMENTS

| CN | 1097223 A | 1/1995 |
| CN | 1745955 A | 3/2006 |

(Continued)

*Primary Examiner* — David J Walczak
(74) *Attorney, Agent, or Firm* — Saliwanchik, Lloyd & Eisenschenk

(57) ABSTRACT

A method and a device for increasing a laser induced shock wave pressure. According to the method, plasmas (21) are generated by impinging an aluminium foil (20) using lasers; a high-voltage pulse electrode (22) discharges to the plasmas (21) to induce and form a photoelectric combined energy field and then high-temperature plasmas (21) having the characteristics of an ultra-high density and an ultra-high speed expansion are induced and generated; a surface to be processed is impacted by the high-temperature plasmas (21) in a restrained state; the laser induced shock wave pressure is increased substantially; the surface of a high-strength material is reinforced, and the strength, hardness, abrasion resistance and anti-fatigue performances of the high-strength material are improved. The device comprises a (Continued)

laser, the electrode (22), a high-voltage power supply (4), a discharging medium (12), a moving platform, etc.

9 Claims, 4 Drawing Sheets

(58) Field of Classification Search
CPC ........ C21D 10/00; C21D 10/005; B06B 1/00; B01F 11/02
See application file for complete search history.

(56) References Cited

FOREIGN PATENT DOCUMENTS

| | | |
|---|---|---|
| CN | 1931467 A | 3/2007 |
| CN | 102199769 A | 9/2011 |
| CN | 102560079 A | 7/2012 |
| CN | 103014314 A | 4/2013 |
| CN | 103343190 A | 10/2013 |
| CN | 103361469 A | 10/2013 |
| CN | 103911505 A | 7/2014 |

\* cited by examiner

US 10,745,776 B2

METHOD AND DEVICE FOR INCREASING LASER-INDUCED SHOCK WAVE PRESSURE

CROSS REFERENCE TO RELATED APPLICATIONS

This application is a National Stage Application of International Application Number PCT/CN2015/089032, filed Sept. 7, 2015; which claims priority to Chinese Application No. 201510494320.1, filed Aug. 13, 2015.

TECHNICAL FIELD

The present invention relates to the technical field of laser shock processing, particularly to laser shocking strengthening technology, in particular to method and device for increasing laser induced shock wave pressure by utilizing the automatically induced composite energy field.

TECHNICAL BACKGROUND

Laser shock strengthening is a new surface deformation strengthening technology. It utilizes stress strengthening and microstructural strengthening induced by high-energy and short pulse laser to realize the surface modification of materials. Compared with the traditional surface strengthening technology, it has distinct characteristics of high voltage (GPa), fast process (ns), high strain rate ($10^7$ s$^{-1}$) and so on, and has significant technical advantages in the controllable strengthening treatment of stress concentration areas of key thin-walled structures in aerospace.

However, process parameters such as laser energy, laser spot diameter and so on, need to be adjusted according to the type and mechanical properties of materials to change the effect of laser shock strengthening. Due to the fact that a reduction of the spot diameter will bring about a reduction in the surface quality, machining efficiency and an increase in the processing cost; at present, the widespread used method in the engineering field to achieve the laser shock strengthening of high strength materials (high strength stainless steel, titanium alloy, nickel base alloy, etc.) is to increase the laser energy, which is inevitable to make the laser energy up to tens of joules. However, at present, due to the limitations of factors such as light frequency, control accuracy, operation cost and volume size, the high power lasers cannot be practically applied in laser shock strengthening field. Therefore, it is a key technical problem in the field of laser shock strengthening to enhance the pressure of laser induced shock wave pressure on the basis of the existing laser energy level.

To solve this problem, CN201210001123, CN200510094810 and CN201310304179 respectively use the high pressure gas, a new water confinement layer and polymer materials to replace the conventional water screen as a new confinement layer to improve the laser induced shock wave pressure. Although these methods make up for some shortage of conventional water screen confinement layer to a certain extent and improve the laser induced shock wave pressure, these methods do not change the generation process of shock wave. Thus, it is impossible to realize the multiple increase of laser shock wave pressure. And the restraint devices of these methods are complex and also cost significantly. The patent application with patent No. CN201310305606 puts forward a pressurized device for laser shock strengthening, which limits the horizontal impact force of the laser shock wave by setting a conical stop sleeve so as to increase the laser induced shock wave pressure. However, this method still cannot realize the multiple increase of laser shock wave pressure. At the same time, it is difficult to achieve multi-point continuous shocking or multi-point overlapping shocking due to that the water film is difficult to keep clean and is easy to splash, and the replacement is complex. In addition, the granted patent with patent No. CN201110120822 presents a method and device for obtaining nano coating on the metal surface by using the strong shock waves generated during the continuous explosion of plasma induced by laser. It significantly increases the laser-induced shock wave pressure by using the continuous explosion of laser in a high pressure resistant glass tube. But the following problems still exist: (1) When the shock waves propagate through the pipe, the pressure decays rapidly, which limit the increase of shock wave pressure generated during the continuous explosion of plasma and makes it difficult to grow exponentially; (2) Shock waves generated by multiple continuous detonation need to be superimposed in multiple times, which requires a very high demand on the control of the explosion time, which further affects the superimposition of shock waves and then reduces the shock wave pressure after multiple error accumulation; (3) The continuous explosion takes a long time, which reduces the processing efficiency.

The granted patent with patent No. CN201210571521 which is closest to the present patent application puts forward a method of carrying out strengthening treatment to the material surface by using a high magnetic field and an electric field to increase the pressure of the laser plasma shock wave. This method has a certain effect on improving the shock wave pressure, but compared to the present application, there are still some deficiencies as follows: (1) Due to the concentration and the charge number of charged particles in the plasma are not uniform, and the motion state changes over time, it is difficult to adjust the size and direction of the magnetic field and the electric field to match them, thus it is difficult to increase the pressure of the shock wave manyfold; (2) In the plasma, since the mass of the charged particles such as electrons are very small and the velocity is very high, it is hard to restrain the charged particles through the magnetic field and the electric field. The reduction of the constraint effect makes it difficult to achieve a multiply increase of the shock wave pressure; (3) The high difficulty in this technology will inevitably lead to complex devices, complicated operation and high cost, so it is difficult to achieve engineering applications.

In order to greatly improve the laser shock wave pressure, and overcome the defects of the existing problems, the present application puts forward a method of using automatic induced photoelectric composite energy field to induce and generate plasma of ultra-high density and ultra-high expansion state, and to exponentially improve laser induced shock wave pressure in a constrained state. The method is simple and easy to implement and the device is of low cost. By searching literatures at home and abroad, there has not found any report relating to automatic induced photoelectric composite energy field at present and using the automatic induced photoelectric composite energy field to induce and generate plasma of ultra-high density and ultra-high expansion state, and thereby improving laser induced shock wave pressure. Therefore, the present invention provides the method and device for the first time.

Contents of the Invention

The purpose of the present invention is to provide a method and a device that utilizes auto-induced composite energy field to greatly improve the laser-induced shock wave pressure. It solves the technical problems in the field of laser shock processing and overcomes the shortcomings and deficiencies of the prior art. Laser-induced shock wave pressure can be increased to several tens of times with the same laser energy. This method is simple and easy to implement and the device has the advantages of low cost and high degree of automation.

A method for increasing laser induced shock wave pressure, wherein generates plasma by using laser to induce aluminum foil. Meanwhile, high-voltage pulse electrodes discharge to the plasma to induce and form the photoelectric composite energy field and then the high-temperature plasma having the characteristics of ultra-high density and super-high speed expansion are induced and generated; a surface to be processed is impacted by the high-temperature plasma in a restrained state; the laser-induced shock wave pressure will be significantly increased to strengthen the surface of high-strength materials and improve strength, hardness, abrasion resistance and anti-fatigue performances of high-strength materials. This method can increase the laser-induced shock wave pressure by several tens of times under the fixed laser energy. This method solves the technical problem that the current laser shock strengthening technology is limited by the laser power and is suitable for laser shock strengthening of high-strength alloy materials. The specific steps of the method are as follows: 1) irradiating the nanosecond pulse laser to the surface of the workpiece affixed with aluminum foil; 2) aluminum foil absorbs laser energy and gasifies; 3) under the action of laser, the gasified substances ionize and generate the plasmoid with conductive characteristics; 4) the plasmoid continues to absorb the laser energy and expands, causing the outer surface of the plasmoid to expand outward rapidly; 5) after the outer surface of the plasmoid enters the discharge gap of the symmetric electrodes, the symmetrical electrodes automatically discharge to automatically induce and form a photoelectric composite energy field, resulting in a high temperature of thousands or even tens of thousands of degrees Celsius, the temperature is much higher than the temperature of laser itself and the pulse discharge temperature; 6) Under the action of high temperature, the plasma density increases and explodes rapidly, and realizes the ultra-high speed expansion of the plasma, the expansion speed is much faster than the plasma expansion speed induced by laser itself; 7) Under the constraint of the discharge medium, the ultra-high speed expansive plasma gas impacts the surface of the workpiece with an ultra-high pressure to produce a significant strengthening effects such as high-density dislocations, high residual compressive stress, etc.

The laser pulse width of the present invention is 10 to 100 ns which can ensure adequate response time of shock wave. In order to ensure uniformity of discharge in all directions in the space and the consistency of plasma expansion speed, the symmetrical electrodes are symmetrically arranged in the horizontal plane around the center of the light spot. And the number of the symmetrical electrodes is 2 to 6.

The critical voltage of the high-voltage power source in the present invention is $$U_0 = E_r \cdot D = E_r(L_1 - Vt_0) = E_r\left(L_1 - Bt_0\sqrt{\frac{E}{\tau d^2}}\right),$$

where $E_r$ is the critical electric field strength when the discharge medium is broken down, D is the distance between the outer surface of the plasma and the electrode when the discharge medium is broken down, $L_1$ is the distance between the discharging end of the electrode and the light spot center on the aluminum foil surface, V is the speed of plasma expansion, t is the time of the discharge medium broken down, E is the laser energy, $\tau$ is the pulse width, d is the diameter of the laser spot, and the constant B can be obtained from the experimental data. The electrode spacing $L_2$ of the symmetrical electrode is 0.8-1.0 R. The distance $L_1$ between the discharging end of the electrode and the light spot center on the aluminum foil surface is maintained at 0.5~0.8 R. R is the diameter of the laser spot.

The time distribution of laser-induced shock wave can be adjusted by the time $t_0$ of the discharge medium broken down. Time $t_0$ of the discharge medium broken down is adjusted by the distance $L_1$ between the discharging end of the electrode and the light spot center on the aluminum foil surface, $t_0$ is specifically described as $$t_0 = \frac{L_1 - D}{V}.$$

The time distribution function of shock wave pressure is $$P(t) = \begin{cases} \overline{P} \cdot A(t) \ \ldots \ (t < t_0) \\ C(U) \cdot \overline{P} \cdot A(t) \ \ldots \ (t \geq t_0) \end{cases},$$

wherein, A(t) is the pressure factor of the laser induced shock wave; the average pressure of shock wave $$\overline{P} = 0.01\sqrt{\frac{\alpha}{2\alpha + 3} \cdot Z \cdot I_0},$$

wherein, $\alpha$ is the laser absorption coefficient, Z is the relative acoustic impedance, $I_0$ is the laser power density, and C(U)~U is the composite field coefficient, in which U is the voltage of the high voltage power source.

A device for greatly improving laser-induced shock wave pressure by utilizing auto-induced composite energy field comprises a laser shock system, a pulse discharge system, and a motion platform system; the laser shock system comprises a laser, a control system and a 45° total reflection mirror; the laser is connected with the control system through the data line; the pulse discharge system includes symmetrical electrodes, a hanging bracket, a horizontal sliding rail, a fluid pump, a storage tank and a high voltage power supply; the symmetrical electrodes are mounted on the horizontal sliding rail which is connected with the hanging bracket; the electrode spacing $L_2$ between the symmetrical electrodes is adjustable along the horizontal sliding rail; the symmetrical electrodes are connected to the high-voltage power supply through high-power wire; the discharge medium is pumped from the storage tank by the fluid pump, and then flows through the entrance of discharge tank into the discharge tank; the discharge medium in the discharge tank flows back to the storage tank through outlet port of the discharge tank; a filter is arranged between the fluid pump and storage tank; the motion platform system comprises an X direction table, a Y direction table and a Z direction table and they are provided with an X direction manual adjustment knob, a Y direction manual adjustment knob and a Z direction manual adjustment knob, respectively. The mineral oil or the deionized water is used as discharge medium. The electroforming Cu or Cu-based composite materials are used as electrodes. It is characterized in the following steps: A. adjusting the electrode spacing $L_2$ between the symmetrical electrodes to 0.8~1.0 R and adjusting the distance $L_1$ between the discharge end of electrode and the spot center on the surface of aluminum foil 20 to 0.5~0.8 R, adjusting the output voltage of the high voltage power supply to the critical voltage to ensure that the symmetrical electrodes can be automatically triggered to discharge by the laser-induced plasma cloud.

B. Turning on the fluid pump to deliver the discharge medium into the discharge tank and ensure that the liquid level of the discharge medium in the discharge tank is higher than the discharge end of the symmetrical electrodes, and then, adjusting the flow rate of the fluid pump to keep the fluid level of the discharge medium constant.

C. Turning on the laser shock system, pulse discharge system and the motion platform system in turn and preheating for 5 to 15 minutes.

D. The collaborative control of laser control system and the motion platform control system is realized by an external computer so that the laser and the motion platform can complete the laser shock strengthening under the photoelectric composite energy field.

E. Turning off the laser, the motion platform and the pulse power in turn, removing the workpiece, cleaning and maintaining the whole system.

The beneficial effects achieved by the present invention patent are as follows:

1. In the method of the present invention, the laser can automatically induce the pulse discharge process by using the conductivity characteristic and the expansion characteristic of plasma to form the composite energy field. This inducing process is easy to implement without any external control.

2. The method of the present invention can significantly increase the plasma density through the composite energy field, which contributes to the increase of shock wave pressure.

3. In the method of the present invention, the local high temperature environment produced by the photoelectric composite energy field can cause the ultra-high speed expansion of the plasma. Therefore, the shock wave pressure can be increased exponentially, and the increasing amplitude is up to several tens of times.

4. The method of the present invention can control the waveform of shock wave and improve the time and space distribution of shock wave pressure by adjusting the breakdown time of the discharge medium;

5. The method of the present invention has the advantages of simple principle, easy implementation and high processing efficiency;

6. The device of the present invention has the advantages of simple structure, high automation and low cost.

EMBODIMENTS

Figure 1:
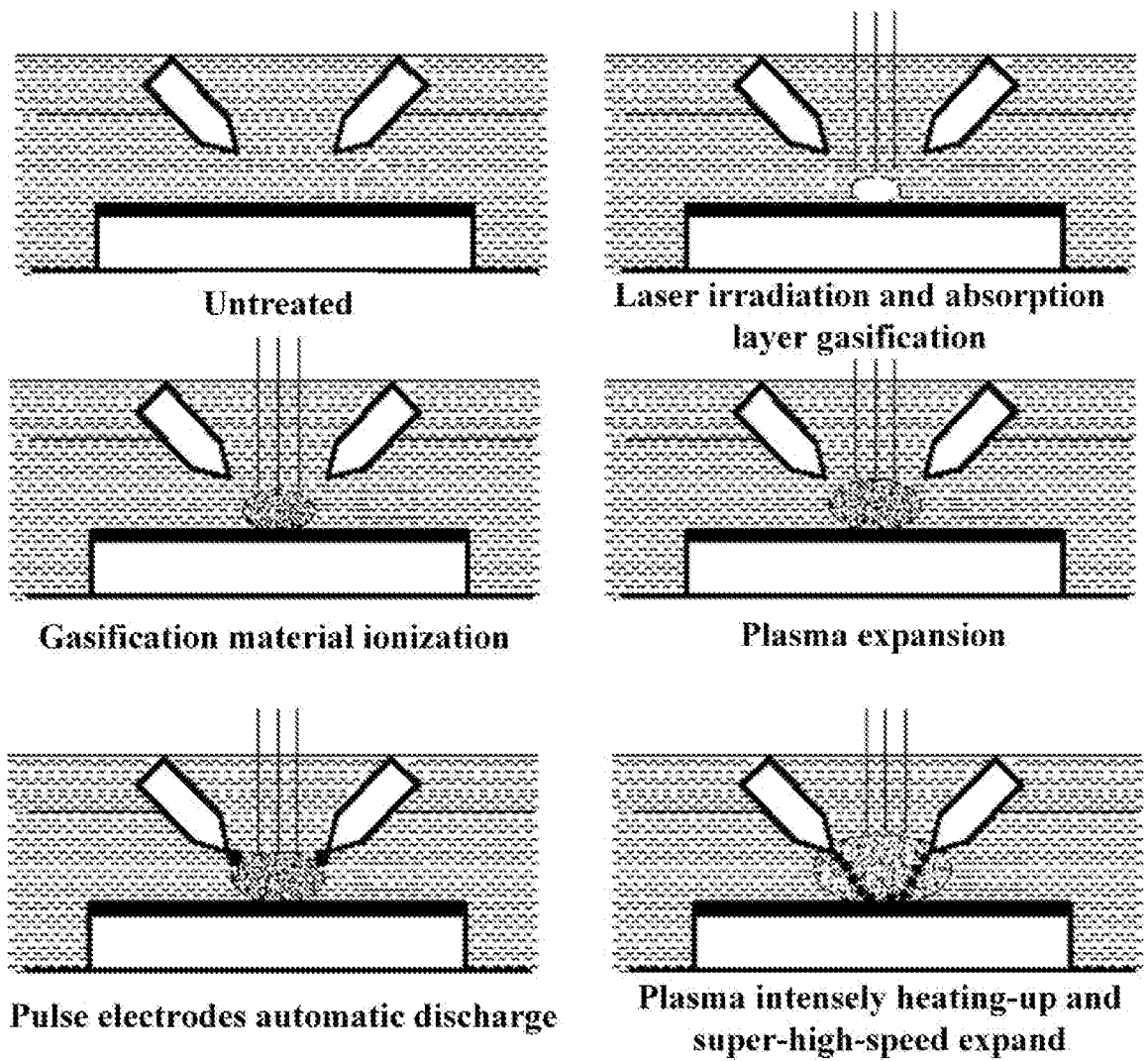
FIG. 1 is a schematic diagram of the method for greatly increasing the pressure of laser-induced shock waves by using an auto-induced composite energy field.
Figure 2:
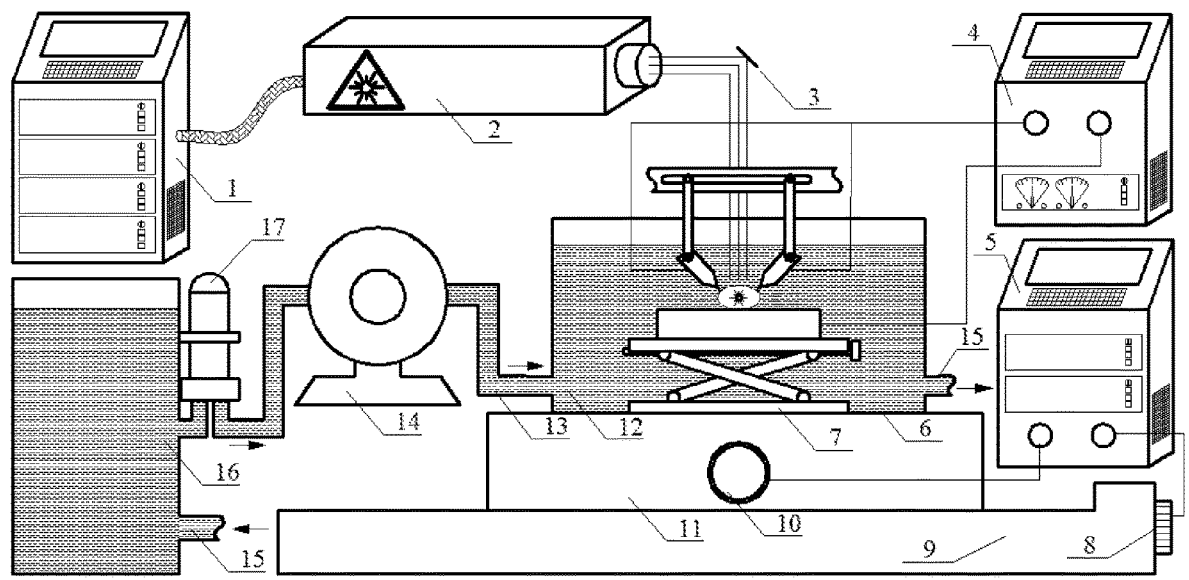
FIG. 2 is diagram of a device for improving the pressure of laser-induced shock wave. Wherein, 1. laser control system, 2. nanosecond laser, 3. 45° total reflection mirror, 4. high voltage power supply, 5. control system of motion platform control system, 6. discharge tank, 7. Z-direction motion platform, 8. X-direction platform manual knob, 9. X-direction motion platform, 10. Y-direction platform manual knob, 11. Y-direction motion platform, 12. discharge medium, 13. the entrance of the discharge tank, 14. fluid pump, 15. the outlet port of the discharge tank, 16. storage tank, 17. filter.
Figure 3:
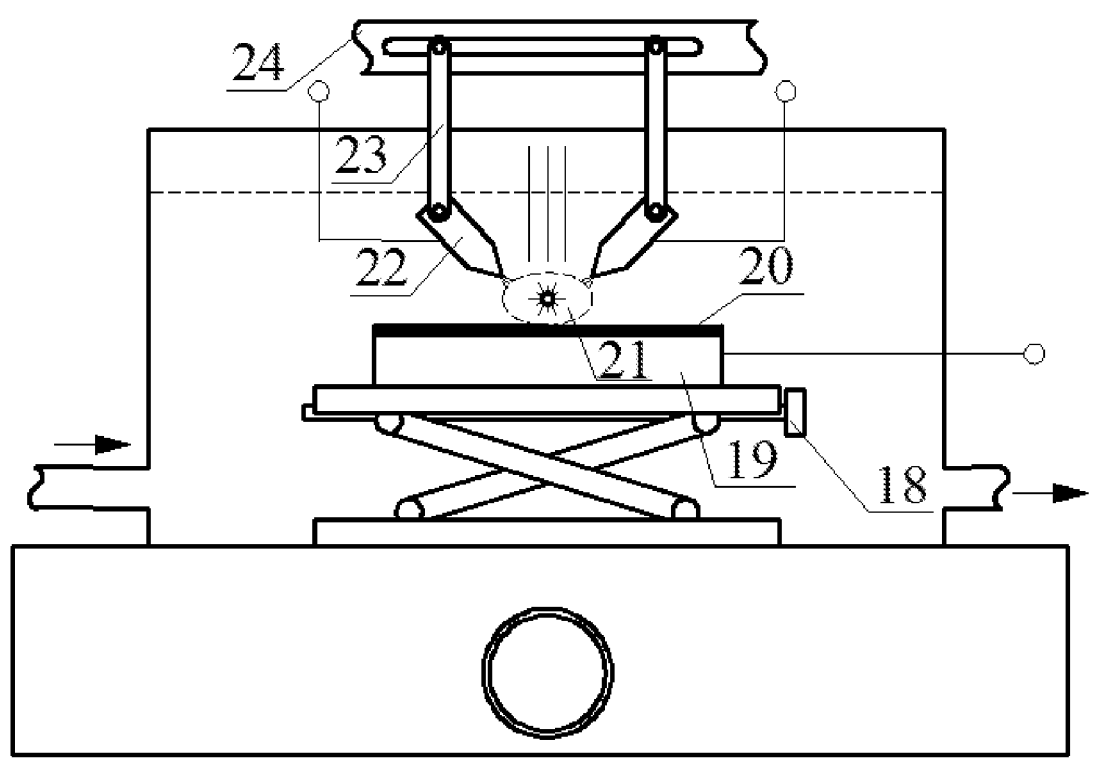
FIG. 3 is a local device diagram that improves the laser-induced shock wave pressure. Wherein, 18. Z-direction platform manual knob, 19. workpiece, 20. aluminum foil, 21. plasma, 22. symmetrical electrodes, 23. hanging bracket, 24. horizontal sliding rail.
Figure 4:
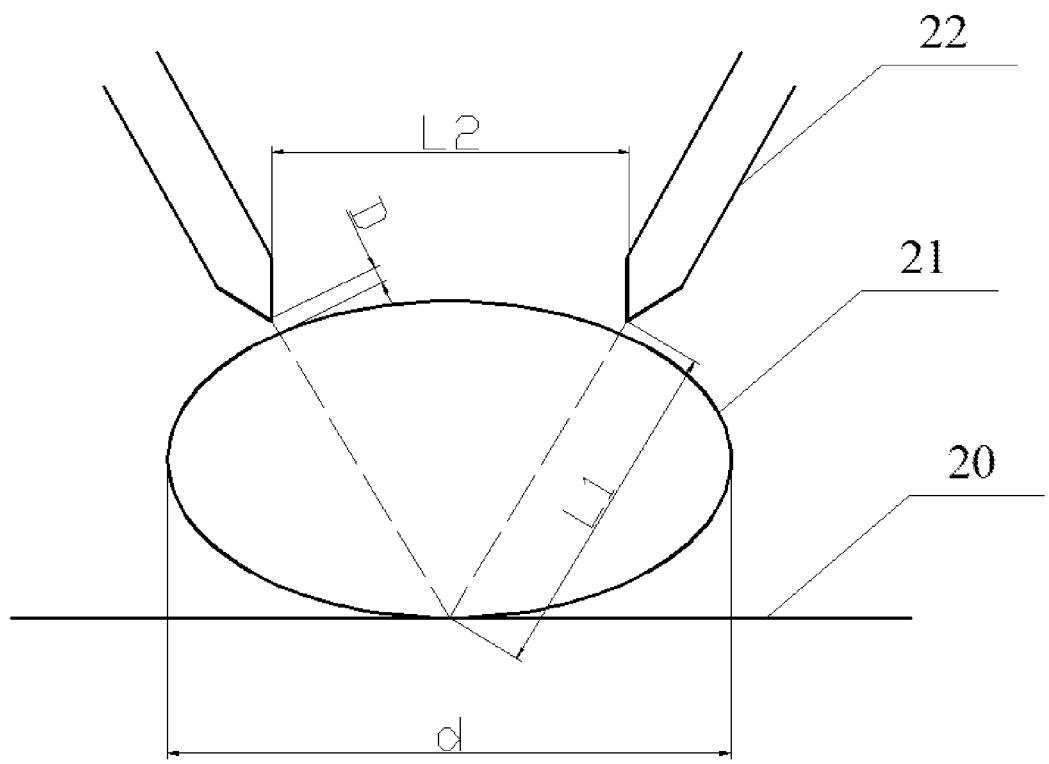
FIG. 4 is a schematic diagram of critical distance parameters ($L_1$, $L_2$, D, d) in the method of improving laser-induced shock wave pressure.

Hereunder the present invention will be further described combined with the drawings and examples.

Example 1

Taking TC4 aerospace titanium alloy as an example, a method that greatly increases the laser induced shock wave pressure by utilizing the auto-induced composite energy field is employed to strengthen this material. Wherein, the laser is a French Thales nanosecond laser, and the laser pulse width is 20 ns. An aluminum foil with a thickness of 120 μm is selected as the absorbing layer. Deionized water is selected as the discharge medium. Symmetrical electrodes are electroforming Cu. The number of electrodes is 2 and the voltage of the high voltage power supply is set to 480 V. The methods and steps are as follows:

A. Adjusting the electrode spacing $L_2$ between the symmetrical electrodes 22 and the distance $L_1$ between the discharge end of electrode and the spot center on the surface of aluminum foil 20 to 0.5~0.8 R; adjusting the output voltage of the high voltage power supply 4 to the critical voltage to ensure that the symmetrical electrodes 22 can be automatically triggered to discharge by the laser-induced plasma cloud.

B. Turning on the fluid pump 14 to deliver the deionized water 12 to the discharge tank and ensure that the fluid level of the deionized water 12 in the discharge tank is higher than the discharge end of the symmetrical electrodes 22, and then, adjusting the flow rate of the fluid pump 14 to keep the fluid level of the deionized water 12 constant.

C. Turning on the laser shock system, pulse discharge system and the motion platform system in turn and preheating for 5 to 15 minutes.

D. The collaborative control of laser control system 1 and the motion platform control system 5 is realized by an external computer so that the laser 2 and the motion platforms 9, 11 and 7 can complete the laser shock strengthening under the photoelectric composite energy field.

E. Turning off the laser 2, the motion platforms 9, 11 and 7 and the pulse power supply 4 in turn, removing the TC4 aerospace titanium alloy workpiece 19, cleaning and maintaining the whole system.

The result shows that the shock wave pressure induced by traditional laser shock process strengthening technology on the surface of TC4 aerospace titanium alloy is about 2.57 GPa with the laser energy of 6 J and the spot diameter of 3 mm. However, when the electrode spacing $L_2$ between symmetry electrodes is 2.7 mm (0.9 R) and the distance $L_1$ between the discharge end of the electrode and the spot center on the surface of the aluminum foil 20 is 1.8 mm (0.6 R), the shock wave pressure induced by the method of the present invention on the surface of TC4 aerospace titanium alloy reaches up to about 8.93 GPa, which is 3.5 times as much as that of the traditional laser shock strengthening technology, and realizes exponential growth of the shock wave pressure.

In addition, the result of the research reveals that when the electrode spacing $L_2$ of between the symmetry electrodes is 2.7 mm (0.9 R) and the distance $L_1$ between the discharge end of the electrode and the spot center on the surface of the aluminum foil 20 is 3.6 mm (1.2 R), the shock wave pressure induced by the method of the present invention on the surface of TC4 aerospace titanium alloy is about 2.52 GPa. It means that the symmetrical electrodes did not be completely discharged and proves that the distance $L_1$ between the discharge end of the electrode and the spot center on the surface of the aluminum foil is one of the key technical parameters to achieve the present invention.

The result of the research also indicates that when the electrode spacing $L_2$ of between the symmetrical electrodes is 4.2 mm (1.4 R) and the distance $L_1$ between the discharge end of the electrode and the spot center on the surface of the aluminum foil 20 is 1.8 mm (0.6 R), the shock wave pressure induced by the method of the present invention on the surface of TC4 aerospace titanium alloy is about 2.43 GPa which also means that the symmetrical electrodes did not be completely discharged. It proves that the electrode spacing $L_2$ between the symmetrical electrodes is also one of the key technical parameters to achieve the present invention.

Example 2

A device for improving the laser induced shock wave pressure includes a laser shock system, a pulse discharge system and a motion platform system. Wherein, the laser shock system comprises a laser 2, a control system 1 and a 45° total reflection mirror 3. The laser 2 is connected with the control system 1 through the data lines. In the pulse discharge system, the symmetrical electrodes are connected with the horizontal sliding rail 24 by the hanging bracket 23 to ensure the electrode spacing $L_2$ is adjustable. The symmetrical electrodes 22 are connected to the high-voltage power supply 4 through high-power wire. The discharge medium 12 is pumped into the discharge tank via the entrance 13 of the discharge tank by the fluid pump 14. A filter is arranged between the fluid pump 14 and storage tank 16. The discharge medium 12 in the discharge tank flows back into the storage tank 16 through outlet port 15 of the discharge tank. The motion platform system comprises an X direction table 9, a Y direction table 11 and a Z direction table 7, and they are provided with manual adjustment knobs 8, 10, and 18, respectively, wherein Z-direction table 9 is used to adjust the distance $L_1$ between the discharge end of the electrode and the spot center on the surface of the aluminum foil 20.

Taking nickel-based alloy IN718 as an example, a device for increasing laser induced shock wave pressure is used to strengthen it. Wherein, the laser is a French Thales nanosecond laser system and the laser pulse width is 20 ns. An aluminum foil with the thickness of 120 μm is used as the absorbing layer. The mineral oil is selected as discharge medium 12. The symmetrical electrodes 22 are made of Cu-based composite material. The number of electrodes is 2 and the voltage of high voltage power supply is 400 V.

The shock wave pressure induced by traditional laser shock strengthening technology on the surface of nickel-based alloy IN718 is about 2.89 GPa with the laser energy of 10 J and the spot diameter of 4 mm. However, when the electrode spacing $L_2$ between the symmetrical electrodes is 3.2 mm (0.8 R) and the distance $L_1$ between the discharge end of the electrode and the spot center on the surface of the aluminum foil 20 is 2 mm (0.5 R), the shock wave pressure induced by the method of this invention on the surface of nickel-based alloy IN718 reaches up to about 8.59 GPa, which is 2.97 times as much as that of the traditional laser shock strengthening technology. It realizes the exponential growth of the shock wave pressure.

The parts not covered by the present invention are the same as those in the prior art or can be implemented by the prior art.

The invention claimed is:

1. A method for increasing laser-induced shock wave pressure, the method comprising:
   using a laser to induce aluminum foil to generate plasma;
   pulse electrodes discharging to the plasma to induce and form a photoelectric composite energy field, thereby inducing and generating the plasma, wherein the plasma is a high-temperature plasma; and
   the plasma in a restrained state impacting a surface to be processed, increasing the laser induced shock wave pressure, strengthening the surface of high-strength materials and improving strength, hardness, abrasion resistance and anti-fatigue performances of high-strength materials,
   wherein a voltage of the pulse electrodes is at least 400 Volts.

2. The method according to claim 1, wherein the surface to be processed is a surface of a workpiece, and wherein the method further comprises:
   A) the surface of the workpiece is affixed with the aluminum foil, and the laser is irradiated on a surface of the aluminum foil, the laser being a nanosecond pulse laser;
   B) the aluminum foil absorbs laser energy to gasify and form gasified substances;
   C) under action of the laser, the gasified substances ionize and generate a plasmoid with conductive characteristics;
   D) the plasmoid continues to absorb the laser energy and expands, making an outer surface of the plasmoid rapidly expand outward;
   E) after the outer surface of the plasmoid enters a discharge gap of the pulse electrodes, the pulse electrodes automatically discharge to automatically induce and form a photoelectric composite energy field and generate a high temperature;
   F) under action of the high temperature, a plasma density of the plasma rapidly increases and explodes, thereby realizing expansion of the plasma; and
   G) under constraint of a discharge medium, the plasma impacts the surface of the workpiece with a shock wave and produces a strengthening effect.

3. The method according to claim 2, wherein the pulse electrodes comprise 2 to 6 symmetrical electrodes, and wherein the symmetrical electrodes are symmetrically arranged in a horizontal plane around a center of a light spot on the aluminum foil.

4. The method according to claim 2, wherein a critical voltage of a power supply of the pulse electrodes is $$U_0 = E_r \cdot D = E_r(L_1 - Vt_0) = E_r\left(L_1 - Bt_0\sqrt{\frac{E}{\tau d^2}}\right),$$

where $E_r$ is a critical electric field strength when the discharge medium is broken down, D is a distance between an outer surface of the plasma and the pulse electrodes when the discharge medium is broken down, $L_1$ is a distance between a discharge end of the pulse electrodes and a spot center on a surface of the aluminum foil, V is a speed of plasma expansion, $t_0$ is a time of the discharge medium being broken down, E is an energy of the laser, r is a pulse width of the laser, d is a diameter of a laser spot, and B is a constant obtained from experimental data.

5. The method according to claim 4, wherein a spacing $L_2$ between the pulse electrodes is 0.8~1.0R, and R is a diameter of the laser spot;
and wherein the distance $L_1$ between the discharge end of the pulse electrodes and the spot center on the surface of the aluminum foil is maintained in a range of 0.5R to 0.8R.

6. The method according to claim 4, wherein a time distribution of the shock wave is adjusted by the time $t_0$ of the discharge medium being broken down, and the time $t_0$ of the discharge medium being broken down is adjusted by the distance $L_1$ between the discharge end of the pulse electrodes and the spot center on the surface of the aluminum foil, the time $t_0$ is calculated as $$t_0 = \frac{L_1 - D}{V},$$

and a time distribution function of a pressure of the shock wave is $$P(t) = \begin{cases} \overline{P} \cdot A(t) & \ldots (t < t_0) \\ C(U) \cdot \overline{P} \cdot A(t) & \ldots (t \geq t_0) \end{cases},$$

where A(t) is a pressure factor of the shock wave, an average pressure of the shock wave, is $$\overline{P} = 0.01\sqrt{\frac{\alpha}{2\alpha + 3} \cdot Z \cdot I_0},$$

α is a, laser absorption coefficient and Z is a relative acoustic impedance; $I_0$ is a power density of the laser, C (U)~U is a composite field coefficient, and U is a voltage of the power supply.

7. The method according to claim 1, wherein, a pulse width of the laser is 10 nanoseconds (ns) to 100 ns.

8. A device implementing the method for improving laser induced shock wave pressure according to claim 1, the device comprising:
a laser shock system;
a pulse discharge system; and
a motion platform system,
wherein the laser shock system comprises the laser, a control system, data lines, and a 45° total reflection mirror,
wherein the laser is connected with the control system through the data lines,
wherein the pulse discharge system includes the pulse electrodes, a hanging bracket, a horizontal sliding rail, a fluid pump, a storage tank, and a power supply supplying the voltage of at least 400 Volts,
wherein the pulse electrodes are mounted on the horizontal sliding rail that is connected with the hanging bracket,
wherein an electrode spacing $L_2$ between the pulse electrodes is adjustable along the horizontal sliding rail
wherein the pulse electrodes are connected to the power supply through a high-power wire,
wherein a discharge medium is pumped from the storage tank by the fluid pump, and then flows through the entrance of a discharge tank into the discharge tank
wherein the discharge medium in the discharge tank flows back to the storage tank through an outlet port of the discharge tank,
wherein a filter is arranged between the fluid pump and the storage tank,
wherein the motion platform system comprises an X-direction table, a Y-direction table, and a Z-direction table which are provided with an X-direction manual adjustment knob, a Y-direction manual adjustment knob, and a Z-direction manual adjustment knob, respectively.

9. The device according to claim 8, wherein the discharge medium comprises mineral oil or deionized water, and wherein the pulse electrodes comprise electroforming Cu or a, Cu-based composite material.

* * * * *